US009593627B2

(12) United States Patent
Fuqua et al.

(10) Patent No.: US 9,593,627 B2
(45) Date of Patent: Mar. 14, 2017

(54) COMBUSTION CHAMBER CONSTRUCTIONS FOR OPPOSED-PISTON ENGINES

(71) Applicant: Achates Power, Inc., San Diego, CA (US)

(72) Inventors: Kevin B. Fuqua, San Diego, CA (US); Fabien G. Redon, San Diego, CA (US); Huixian Shen, Southfield, MI (US); Michael H. Wahl, Bonita, CA (US); Brendan M. Lenski, West Bloomfield, MI (US)

(73) Assignee: ACHATES POWER, INC., San Diego, CA (US)

( * ) Notice: Subject to any disclaimer, the term of this patent is extended or adjusted under 35 U.S.C. 154(b) by 73 days.

(21) Appl. No.: 14/456,865

(22) Filed: Aug. 11, 2014

(65) Prior Publication Data

US 2015/0013649 A1  Jan. 15, 2015

Related U.S. Application Data

(63) Continuation of application No. 13/066,589, filed on Apr. 18, 2011, now Pat. No. 8,800,528.
(Continued)

(51) Int. Cl.
*F02B 75/28* (2006.01)
*F02F 3/00* (2006.01)
(Continued)

(52) U.S. Cl.
CPC ............... *F02B 75/28* (2013.01); *F01B 7/02* (2013.01); *F02B 23/0621* (2013.01);
(Continued)

(58) Field of Classification Search
CPC ........ F02B 75/28; F02B 75/282; F02B 25/08; F02B 25/10; F02B 23/0618; F02B 23/0621;
(Continued)

(56) References Cited

U.S. PATENT DOCUMENTS

| 665,475 A | 1/1901 | Schweitzer |
| 667,298 A | 2/1901 | Cunningham |

(Continued)

FOREIGN PATENT DOCUMENTS

| BE | 388676 | 5/1932 |
| DE | 4335515 A1 | 4/1995 |

(Continued)

OTHER PUBLICATIONS

Hofbauer, P., *SAE Publication 2005-01-1548*, "Opposed Piston Opposed Cylinder (opoc) Engine for Military Ground Vehicles," Apr. 2005.
(Continued)

*Primary Examiner* — Mahmoud Gimie
*Assistant Examiner* — John Zaleskas
(74) *Attorney, Agent, or Firm* — Terrance A. Meador; Julie J. Muyco

(57) ABSTRACT

A combustion chamber for an opposed-piston engine includes a squish zone defined between circumferential peripheral areas of opposing end surfaces of the pistons, a cavity defined by one or more bowls in the end surfaces, and at least one injection port that extends radially through the squish zone into the cavity. The cavity has a cross-sectional shape that imposes a tumbling motion on air flowing from the squish zone into the cavity.

7 Claims, 13 Drawing Sheets

Related U.S. Application Data

(60) Provisional application No. 61/343,308, filed on Apr. 27, 2010, provisional application No. 61/395,845, filed on May 18, 2010, provisional application No. 61/401,598, filed on Aug. 16, 2010.

(51) Int. Cl.
   *F02F 3/24*   (2006.01)
   *F02B 23/06*  (2006.01)
   *F01B 7/02*   (2006.01)

(52) U.S. Cl.
   CPC ...... *F02B 23/0624* (2013.01); *F02B 23/0633* (2013.01); *F02B 23/0651* (2013.01); *F02B 23/0663* (2013.01); *F02B 23/0675* (2013.01); *F02B 23/0678* (2013.01); *F02B 75/282* (2013.01); *F02F 3/0015* (2013.01); *F02F 3/24* (2013.01); *F02B 2275/48* (2013.01); *Y02T 10/125* (2013.01)

(58) Field of Classification Search
   CPC  F02B 23/0624; F02B 23/063; F02B 23/0633; F02B 23/0672; F02B 23/0675; F02B 23/0678; F02B 23/0681; F02B 23/0684; F02B 23/0687; F02B 23/069; F02B 23/0693; F02B 23/0696; F02B 2275/40; F02B 2275/48; F01B 7/02; F01B 7/14; F02F 3/26
   USPC ........ 123/51 B, 51 BA, 51 BD, 51 R, 193.6, 123/295, 299, 301
   See application file for complete search history.

(56) References Cited

U.S. PATENT DOCUMENTS

| | | | |
|---|---|---|---|
| 673,160 A | 4/1901 | Diesel | |
| 1,143,408 A | 6/1915 | Kramer | |
| 1,207,799 A * | 12/1916 | Scheller | 123/281 |
| 1,312,604 A | 8/1919 | Wygodsky | |
| 1,423,088 A | 7/1922 | Crossley et al. | |
| 1,464,268 A | 8/1923 | Otto | |
| 1,486,583 A * | 3/1924 | Huskisson | F02B 75/282 123/41.83 |
| 1,515,391 A * | 11/1924 | Keller | F02B 23/00 123/276 |
| 1,523,453 A * | 1/1925 | Lane | F02B 23/00 123/51 B |
| 1,582,792 A | 4/1926 | Schultz | |
| 1,623,704 A * | 4/1927 | Lane | F02B 75/28 123/51 B |
| 1,644,954 A | 10/1927 | Shearer | |
| 1,662,828 A | 3/1928 | Law | |
| 1,808,664 A * | 6/1931 | Koschka | F02B 75/26 123/41.35 |
| 1,837,870 A * | 12/1931 | Johnston | F01B 7/14 123/198 DC |
| 1,853,562 A | 4/1932 | Herr | |
| 1,854,190 A | 4/1932 | Herr | |
| 1,967,630 A | 7/1934 | Rusberg | |
| 1,978,194 A | 10/1934 | Gray | |
| 2,014,672 A | 9/1935 | Schmaljohann | |
| 2,110,116 A | 3/1938 | Heraclio | |
| 2,132,083 A * | 10/1938 | Pateras | F02B 71/00 123/275 |
| 2,173,081 A * | 9/1939 | Barkeij | F02B 9/00 123/275 |
| 2,196,429 A | 4/1940 | Siciliano | |
| 2,337,245 A | 12/1943 | Jacklin | |
| 2,354,620 A * | 7/1944 | Smith | F02C 5/06 123/41.79 |
| 2,393,085 A | 1/1946 | Wuehr | |
| 2,396,429 A * | 3/1946 | Krygsman | F02B 45/02 123/51 B |
| 2,440,310 A | 4/1948 | Thege | |
| 2,463,418 A | 3/1949 | Pescara | |
| 2,530,884 A * | 11/1950 | Laraque | F01B 7/12 123/197.1 |
| 2,565,368 A * | 8/1951 | Hammick | F01B 7/14 123/51 BC |
| 2,607,328 A | 8/1952 | Jencick | |
| 2,646,779 A | 7/1953 | Fiser | |
| 2,682,862 A * | 7/1954 | Camner | F02B 3/00 123/276 |
| 2,699,156 A | 1/1955 | Karrow | |
| 2,731,003 A | 1/1956 | Morris | |
| 2,748,757 A * | 6/1956 | Morris | F02B 25/00 123/294 |
| 2,805,654 A | 9/1957 | Jacklin | |
| 2,853,983 A | 9/1958 | Sawle | |
| 3,023,743 A * | 3/1962 | Schauer, Jr. | F01B 7/14 123/294 |
| 3,033,184 A | 5/1962 | Jackson | |
| 3,117,566 A | 1/1964 | Venediger | |
| 3,134,373 A * | 5/1964 | Schauer, Jr. | F01B 7/14 123/51 BA |
| 3,209,736 A * | 10/1965 | Witzky | F01B 7/12 123/48 R |
| 3,411,289 A | 11/1968 | Antonsen et al. | |
| 4,030,471 A * | 6/1977 | Ginkel | F01B 1/0613 123/197.1 |
| 4,090,479 A | 5/1978 | Kaye | |
| 4,248,183 A * | 2/1981 | Noguchi | F01B 7/14 123/51 B |
| 4,257,365 A * | 3/1981 | Noguchi | F02B 25/08 123/51 B |
| 4,452,221 A | 6/1984 | Keating | |
| 4,491,096 A * | 1/1985 | Noguchi | F01B 1/10 123/51 B |
| 4,574,754 A * | 3/1986 | Rhoades, Jr. | F02B 17/005 123/188.11 |
| 4,622,927 A * | 11/1986 | Wenker | F01B 3/02 123/51 B |
| 4,791,787 A * | 12/1988 | Paul | F02B 77/02 123/193.2 |
| 4,872,433 A * | 10/1989 | Paul | F02B 23/02 123/257 |
| 4,905,637 A * | 3/1990 | Ott | F01B 3/0026 123/196 R |
| 5,042,441 A * | 8/1991 | Paul | F01B 7/14 123/257 |
| 5,081,963 A * | 1/1992 | Galbraith | F01L 1/34 123/188.5 |
| 5,083,530 A | 1/1992 | Rassey | |
| 5,711,269 A * | 1/1998 | Oda | F02B 17/005 123/262 |
| 6,161,518 A | 12/2000 | Nakakita et al. | |
| 6,170,443 B1 * | 1/2001 | Hofbauer | F02B 25/08 123/51 B |
| 6,182,619 B1 * | 2/2001 | Spitzer | F02B 25/08 123/51 B |
| 6,345,601 B1 | 2/2002 | Miyajima et al. | |
| 6,443,122 B1 | 9/2002 | Denbratt et al. | |
| 6,854,440 B2 | 2/2005 | Cathcart et al. | |
| 6,874,489 B2 | 4/2005 | Yonekawa et al. | |
| 6,928,997 B2 | 8/2005 | Yu | |
| 6,997,158 B1 | 2/2006 | Liu | |
| 7,210,448 B2 | 5/2007 | Stanton et | |
| 7,284,524 B2 | 10/2007 | Matas et al. | |
| 7,428,889 B2 * | 9/2008 | Salzgeber | F02F 3/22 123/193.6 |
| 7,438,039 B2 | 10/2008 | Poola et al. | |
| 7,597,084 B2 | 10/2009 | Vachon et al. | |
| 8,549,854 B2 | 10/2013 | Dion et al. | |
| 8,800,528 B2 | 8/2014 | Fuqua et al. | |
| 8,820,294 B2 | 9/2014 | Fuqua et al. | |
| 2005/0066929 A1 | 3/2005 | Liu | |
| 2005/0150478 A1 | 7/2005 | Nomura | |
| 2006/0124084 A1 | 6/2006 | Hofbauer et al. | |

(56) References Cited

U.S. PATENT DOCUMENTS

| | | |
|---|---|---|
| 2006/0157003 A1 | 7/2006 | Lemke et al. |
| 2007/0272191 A1 | 11/2007 | Tsujimoto et al. |
| 2008/0006238 A1 | 1/2008 | Hofbauer et al. |
| 2008/0115771 A1 | 5/2008 | Elsbett |
| 2008/0127947 A1 | 6/2008 | Hofbauer et al. |
| 2009/0139476 A1* | 6/2009 | Hofbauer ............ F02B 1/12 123/55.2 |
| 2009/0139485 A1 | 6/2009 | Pontoppidan |
| 2009/0159022 A1 | 6/2009 | Chu |
| 2010/0006061 A1 | 1/2010 | Shibata et al. |
| 2010/0107868 A1 | 5/2010 | Scharp et al. |
| 2010/0108044 A1 | 5/2010 | Liu |
| 2010/0224162 A1 | 9/2010 | Hofbauer |
| 2010/0282219 A1* | 11/2010 | Alonso ............... F01B 3/10 123/51 AA |
| 2011/0041684 A1 | 2/2011 | Kortas et al. |
| 2011/0067671 A1* | 3/2011 | Laimboeck ......... F02B 23/104 123/298 |
| 2011/0114038 A1* | 5/2011 | Lemke ............... F16J 9/14 123/41.35 |
| 2011/0271932 A1* | 11/2011 | Fuqua ............... F01B 7/02 123/301 |
| 2012/0073526 A1* | 3/2012 | Dion ................. F01B 7/08 123/41.44 |
| 2012/0073541 A1* | 3/2012 | Fuqua ............... F01B 7/02 123/301 |
| 2012/0080007 A1* | 4/2012 | Herold ............... F02B 23/0645 123/299 |
| 2012/0125298 A1 | 5/2012 | Lemke et al. |
| 2012/0192831 A1* | 8/2012 | Tusinean ............ F02B 23/0663 123/299 |
| 2012/0234285 A1 | 9/2012 | Venugopal et al. |
| 2012/0285418 A1 | 11/2012 | Elsbett et al. |
| 2013/0014718 A1* | 1/2013 | Shen ................. F02B 23/0675 123/18 A |
| 2013/0025556 A1* | 1/2013 | Hofbauer ............ F01B 7/08 123/18 R |
| 2013/0036999 A1* | 2/2013 | Levy ................. F02B 75/282 123/299 |
| 2013/0104848 A1 | 5/2013 | Klyza et al. |
| 2013/0112175 A1* | 5/2013 | Wahl ................. F02F 3/16 123/51 R |
| 2013/0146021 A1* | 6/2013 | Hofbauer ............ F02B 17/005 123/299 |
| 2013/0213342 A1 | 8/2013 | Burton et al. |
| 2014/0014063 A1 | 1/2014 | Redon |
| 2014/0083396 A1* | 3/2014 | Burton ............... F01B 7/02 123/51 R |
| 2014/0090625 A1* | 4/2014 | Dion ................. F02F 3/16 123/51 R |
| 2015/0033736 A1 | 2/2015 | Kalebjian et al. |

FOREIGN PATENT DOCUMENTS

| | | | |
|---|---|---|---|
| DE | 19651175 A1 | 6/1998 | |
| DE | 10141888 A1 | 4/2003 | |
| DE | 102004010361 A1 | 12/2004 | |
| DE | 102006055251 A1 | 5/2008 | |
| DE | 102008055911 A1 | 5/2010 | |
| FR | 50349 | 3/1940 | |
| GB | 191409948 | 4/1915 | |
| GB | 320439 | 10/1929 | |
| GB | 320439 A * | 10/1929 | ............ F02B 23/00 |
| GB | 531366 | 1/1941 | |
| GB | 540658 A | 10/1941 | |
| GB | 552758 A | 4/1943 | |
| GB | 562343 | 6/1944 | |
| GB | 2493260 | 1/2013 | |
| JP | 52004909 A | 1/1977 | |
| JP | 2009-138718 | 6/2009 | |
| SU | 1216394 A1 | 3/1986 | |
| WO | WO-99/58830 | 11/1999 | |
| WO | WO-01/25618 A1 | 4/2001 | |
| WO | WO-02/48524 A1 | 6/2002 | |
| WO | WO-2006/105390 A1 | 10/2006 | |
| WO | WO-2007/006469 A2 | 1/2007 | |
| WO | WO-2009/061873 A1 | 5/2009 | |
| WO | WO-2011/061191 A1 | 5/2011 | |
| WO | WO-2011/139332 A1 | 11/2011 | |
| WO | WO-2012/023970 A2 | 2/2012 | |
| WO | WO-2012/023975 A1 | 2/2012 | |
| WO | WO-2012/158756 A1 | 11/2013 | |

OTHER PUBLICATIONS

Franke, M., *SAE Publication 2006-01-0277*, "Opposed Piston Opposed Cylinder (opoc) 450 Engine: Performance Development by CAE Simulations and Testing," M. Franke, et al, Apr. 2006.

Hirsch, N.R., et al, *SAE Publication 2006-01-0926*, "Advanced Opposed Piston Two-stroke Diesel Demonstrator," Apr. 2006.

Pirault, J-P., et al, *Opposed Piston Engines: Evolution, Use, and Future Applications*, 2010, pp. 231-245.

International Search Report/Written Opinion for PCT/US2011/000692, mailed Aug. 18, 2011.

International Search Report/Written Opinion for PCT/US2011/001436, mailed Nov. 3, 2011.

International Search Report/Written Opinion for PCT/US2012/038061, mailed May 16, 2012.

International Search Report/Written Opinion for PCT/US2014/026670, mailed Jul. 10, 2014.

* cited by examiner

COMBUSTION CHAMBER CONSTRUCTIONS FOR OPPOSED-PISTON ENGINES

PRIORITY AND RELATED APPLICATIONS

This application is a continuation of U.S. patent application Ser. No. 13/066,589, filed Apr. 18, 2011, which will issue as U.S. Pat. No. 8,800,528 on Aug. 12, 2014, and which claims priority to U.S. provisional application for patent 61/343,308, filed Apr. 27, 2010, to U.S. provisional application for patent 61/395,845, filed May 18, 2010, and to U.S. provisional application for patent 61/401,598, filed Aug. 16, 2010.

BACKGROUND

The field is combustion chambers for internal combustion engines. In particular, the field includes constructions for opposed-piston engines in which a combustion chamber is defined between end surfaces of pistons disposed in opposition in the bore of a ported cylinder. More particularly, the field includes opposed-piston engines with combustion chamber constructions that produce a tumbling motion in charge air admitted into the cylinder between the piston end surfaces.

Per FIG. 1, an opposed-piston engine includes at least one cylinder 10 with a bore 12 and longitudinally-displaced intake and exhaust ports 14 and 16 machined or formed therein. One or more fuel injectors 17 are secured in injector ports (ports where injectors are positioned) that open through the side surface of the cylinder. Two pistons 20, 22 according to the prior art are disposed in the bore 12 with their end surfaces 20e, 22e in opposition to each other. For convenience, the piston 20 is denominated as the "intake" piston because of its proximity to the intake port 14. Similarly, the piston 22 is denominated as the "exhaust" piston because of its proximity to the exhaust port 16.

Operation of an opposed-piston engine with one or more ported cylinders (cylinders with one or more of intake and exhaust ports formed therein) such as the cylinder 10 is well understood. In this regard, in response to combustion the opposed pistons move away from respective top dead center (TDC) positions where they are at their innermost positions in the cylinder 10. While moving from TDC, the pistons keep their associated ports closed until they approach respective bottom dead center (BDC) positions where they are at their outermost positions in the cylinder. The pistons may move in phase so that the intake and exhaust ports 14, 16 open and close in unison. Alternatively, one piston may lead the other in phase, in which case the intake and exhaust ports have different opening and closing times.

In many opposed piston constructions, a phase offset is introduced into the piston movements. As shown in FIG. 1, for example, the exhaust piston leads the intake piston and the phase offset causes the pistons to move around their BDC positions in a sequence in which the exhaust port 16 opens as the exhaust piston 22 moves through BDC while the intake port 14 is still closed so that combustion gasses start to flow out of the exhaust port 16. As the pistons continue moving away from each other, the intake piston 20 moves through BDC causing the intake port 14 to open while the exhaust port 16 is still open. A charge of pressurized air is forced into the cylinder 10 through the open intake port 14, driving exhaust gasses out of the cylinder through the exhaust port 16. As seen in FIG. 1, after further movement of the pistons, the exhaust port 16 closes before the intake port 14 while the intake piston 20 continues to move away from BDC. Typically, the charge of fresh air is swirled as it passes through ramped openings of the intake port 14. With reference to FIG. 1, the swirling motion (or simply, "swirl") 30 is a generally helical movement of charge air that circulates around the cylinder's longitudinal axis and moves longitudinally through the bore of the cylinder 10. Per FIG. 2, as the pistons 20, 22 continue moving toward TDC, the intake port 14 is closed and the swirling charge air remaining in the cylinder is compressed between the end surfaces 20e and 22e. As the pistons near their respective TDC locations in the cylinder bore, fuel 40 is injected into the compressed charge air 30, between the end surfaces 20e, 22e of the pistons. As injection continues, the swirling mixture of air and fuel is increasingly compressed in a combustion chamber 32 defined between the end surfaces 20e and 22e as the pistons 20 and 22 move through their respective TDC locations. When the mixture reaches an ignition temperature, the fuel ignites in the combustion chamber, driving the pistons apart toward their respective BDC locations.

Turbulence is a desirable feature of charge air motion as fuel injection begins. Turbulence encourages the mixing of charge air with fuel for more complete and more uniform ignition than would otherwise occur. The geometries of the intake port openings and the cylinder of an opposed-piston engine provide a very effective platform for generation of a strong swirling motion of the charge air that promotes both removal of exhaust gasses (scavenging) and charge air turbulence. However, charge air motion that is dominated by swirl can produce undesirable effects during combustion. For example, during combustion in a cylindrical combustion chamber defined between flat piston end surfaces, swirl pushes the flame toward the cylinder bore, causing heat loss to the (relatively) cooler cylinder wall. The higher velocity vectors of swirl occur near the cylinder wall, which provides the worst scenario for heat losses: high temperature gas with velocity that transfers heat to the cylinder wall and lowers the thermal efficiency of the engine. The peripheries of the piston end surfaces also receive a relatively high heat load, which causes formation of a solid residue of oil coke that remains in the piston/cylinder interface when lubricating oil breaks down at high engine temperatures. Accordingly, in such opposed-piston engines, it is desirable to maintain charge air turbulence as injection starts while mitigating the undesirable effects produced by swirl.

In certain opposed-piston combustion chamber constructions, turbulence is produced by squish flow from the periphery of the combustion chamber in a radial direction of the cylinder toward the cylinder's axis. Squish flow is generated by movement of compressed air from a relatively high-pressure region at the peripheries of the piston end surfaces to a lower-pressure region generated by a bowl formed in at least one piston end surface. Squish flow promotes charge air turbulence in the combustion chamber. For example, U.S. Pat. No. 6,170,443 discloses a cylinder with a pair of opposed pistons having complementary end surface constructions. A circular concave depression formed in one end surface is symmetrical with respect to the axis of its piston and rises to a point in its center. The periphery of the opposing end surface has a convex shape in the center of which a semi-toroidal (half donut-shaped) trench is formed. As the pistons approach TDC, they define a generally toroidally-shaped combustion chamber centered on the longitudinal axis of the cylinder. The combustion chamber is surrounded by a circumferential squish band defined between the concave and convex surface shapes. As the pistons approach TDC, the squish band generates an inwardly-directed squish flow into the toroidal trench and creates "a swirl of high intensity near top dead center." See the '443 patent at column 19, lines 25-27. Fuel is injected into the toridal combustion chamber in a radial direction of the bore.

Increasing the turbulence of charge air in the combustion chamber increases the effectiveness of air/fuel mixing. Domination of charge air motion by swirl or squish flow alone does achieve a certain level of turbulence. Nevertheless, it is desirable to create additional elements of charge air motion as injection commences in order to produce even more turbulence of the charge air, thereby to achieve better air/fuel mixing than can be obtained with swirl or squish alone.

SUMMARY

An aspect of an invention completed in respect of the objective described above is to have the piston end surfaces define a combustion chamber that creates a charge air motion component in addition to swirl and squish.

Another aspect of an invention completed in respect of the objective described above is to have the piston end surfaces define a combustion chamber that interacts with squish and swirl to produce one or more tumbling components in charge air motion in the combustion chamber.

Preferably, the tumbling motion is a rotating movement of charge air that is transverse to and circulates across the longitudinal axis of the cylinder. Preferably, the tumbling motion is a circulation of charge air that circulates around a diameter of the cylinder bore.

In a preferred construction, a combustion chamber defined between the opposing end surfaces is bordered by a squish zone that defines at least one squish flow path that is skewed with respect to the cylinder bore. Preferably, the combustion chamber is defined by a bowl formed in at least one piston end surface. In some instances, the bowl is clam-shell-shaped. In other instances the bowl has the shape of an elongated tapered cylinder. In some aspects, the bowl has an elongated ellipsoidal shape.

In another preferred construction, a combustion chamber is defined by the end surfaces of the opposed pistons at TDC, in which one piston end surface has a circumferential area centered on the longitudinal axis of the piston, and a bowl within the circumferential area and the other piston end surface is flat. Preferably, the combustion chamber is clam-shell-shaped.

In another preferred construction, a combustion chamber is defined between end surfaces of the opposed pistons, in which each piston end surface has a circumferential area centered on the longitudinal axis of the piston, and a bowl within the circumferential area that defines a concave surface with a first portion curving inwardly from a plane containing the circumferential contact area toward the interior of the piston and a second portion curving outwardly from the interior of the piston through the plane containing the circumferential contact area. Preferably, the combustion chamber has the shape of an elongated ellipsoid.

In still another preferred construction, a method is provided for operating an internal combustion engine including at least one cylinder with longitudinally-separated exhaust and intake ports, and a pair of pistons disposed in opposition for reciprocating in a bore of the cylinder, by forming a combustion chamber having an elongated ellipsoidal shape between the end surfaces of the pistons as the pistons move toward respective TDC positions, generating squish flows of charge air having a direction that is skewed with respect to a major axis of the combustion chamber, generating at least one tumbling motion of charge air in the combustion chamber in response to the squish flow and swirling charge air, and injecting fuel into the combustion chamber.

DETAILED DESCRIPTION OF THE PREFERRED CONSTRUCTIONS

Figures 1, 2:
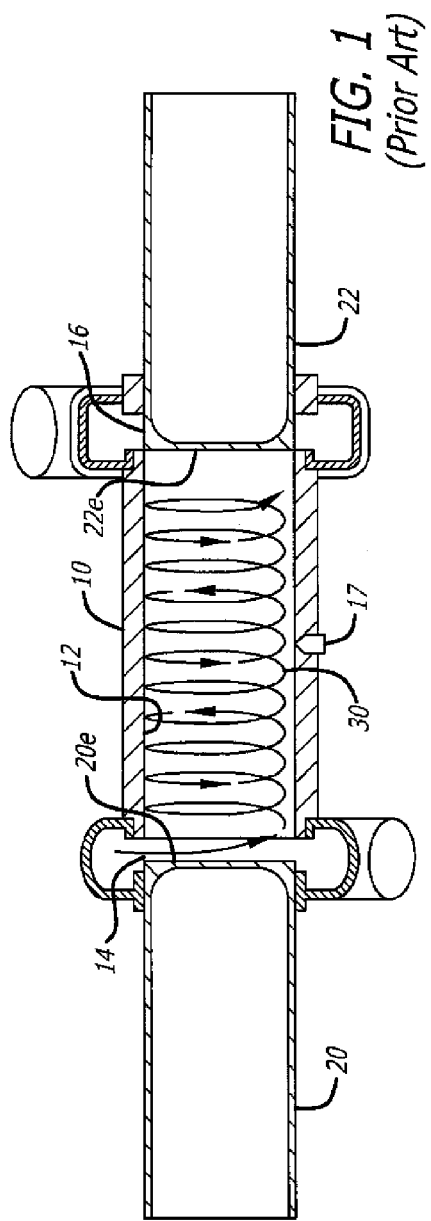
FIG. 1 is a side sectional partially schematic drawing of a cylinder of an opposed-piston engine with prior art opposed pistons near respective bottom dead center locations, and is appropriately labeled "Prior Art".
FIG. 2 is a side sectional partially schematic drawing of the cylinder of FIG. 1 with the prior art opposed pistons near respective top dead center locations where flat end surfaces of the pistons define a prior art combustion chamber, and is appropriately labeled "Prior Art".

In the combustion chamber constructions to be described, an internal combustion engine includes at least one cylinder with longitudinally-separated exhaust and intake ports; see, for example, the cylinder 10 illustrated in FIGS. 1 and 2. A pair of pistons is disposed in opposition in a bore of the cylinder and a combustion chamber structure is defined between the opposing end surfaces of the pistons as the pistons move toward top dead center positions. A circumferential area defines a periphery on each of the end surfaces.

The combustion chamber includes a cavity defined between the end surfaces, and has at least one opening through which fuel is injected (hereinafter an "injection port") that extends at least generally in radial direction of the cylinder and opens into the cavity.

During operation of the internal combustion engine, as the pistons approach TDC, one or more squish zones direct flows of compressed air (called "squish flows") into the combustion chamber in at least one direction that is skewed with respect to a diametrical direction of the bore. This process is referred to as "generating squish". The portions of the end surfaces that generate squish are referred to as squish surfaces, and channels defined between the squish surfaces are referred to as squish channels. Squish flow is deflected or redirected by one or more curved surfaces in a combustion chamber cavity into at least one tumble motion that circulates in the cavity.

In the following descriptions, "fuel" is any fuel that can be used in an opposed-piston engine. The fuel may be a relatively homogeneous composition, or a blend. For example, the fuel may be diesel fuel or any other fuel ignitable by compression ignition. Further, the descriptions contemplate ignition resulting from compression of an air/fuel mixture; however it may be desirable to provide additional mechanisms, such as glow plugs, to assist compression ignition. The descriptions contemplate injection of fuel into a compressed gas in a combustion chamber when opposed pistons are at or near TDC locations. The gas is preferably pressurized ambient air; however, it may include other components such as exhaust gases or other diluents. In any such case, the gas is referred to as "charge air."

Figure 3:
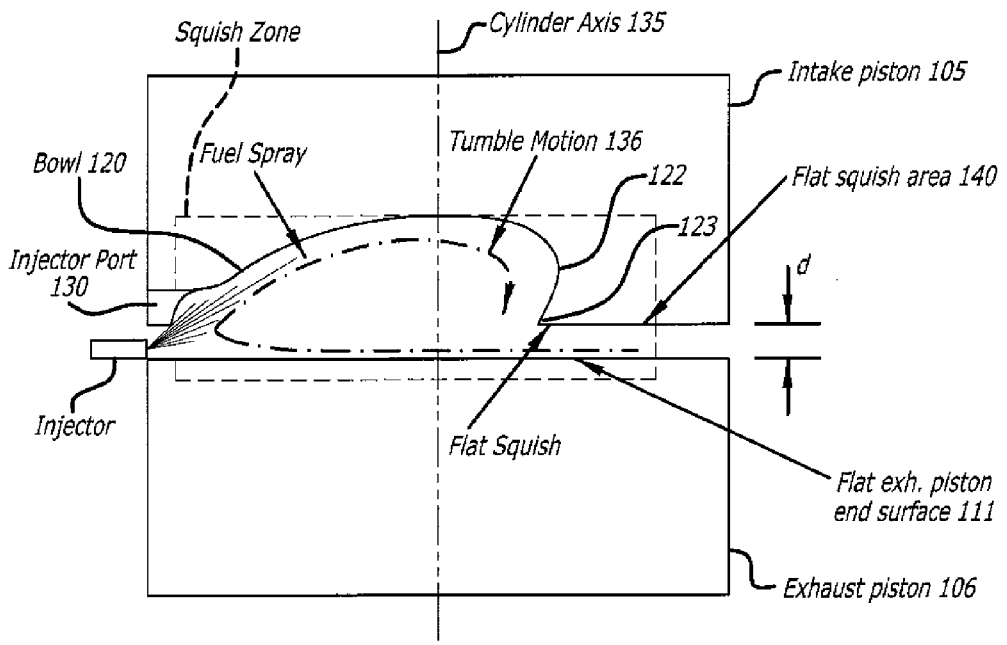
FIG. 3 is a side schematic view of a pair of opposed pistons in which the end surfaces of the pistons define a first combustion chamber construction.

First Combustion Chamber Construction:

FIG. 3 is a schematic diagram of a pair of opposed pistons with end surfaces that define a first combustion chamber construction as the pistons approach respective TDC locations. The cylinder in which the pistons are disposed is represented by an axis with which the axes of the pistons are collinear. The combustion chamber includes one piston end surface shaped to produce a tumbling motion that curves across the cylinder's axis. This construction includes a squish zone in which a curved cavity between the end surfaces redirects air flowing toward the center of the squish zone into a tumbling motion. The cavity is defined by a bowl formed in a portion of the end surface of one of the pistons; preferably, but not necessarily, that piston is the intake piston. A flat peripheral portion of the end surface surrounds the bowl. An injection port opens into the bowl, through the peripheral portion. Preferably, but not necessarily, the injection port is oriented in a direction radial to the piston. The opposing piston (preferably, the exhaust piston) has a flat, essentially planar end surface. Air is compressed between the flat portions of the piston end surfaces, creating a high velocity squish flow of compressed air moving into the bowl in a radial direction of the cylinder. A portion of the squish flow is deflected or redirected from the radial direction, along the curved surface of the bowl, to generate a tumble flow in the combustion chamber that circulates across the axis of the cylinder. Preferably, fuel is injected in the same direction as the tumble motion so that the fuel can be conveyed by the tumbling air movement. If the charge air is initially swirled when entering the cylinder through an intake port (not shown), the motion of the charge air in the combustion chamber includes elements of swirl, squish, and tumble.

Figure 4:
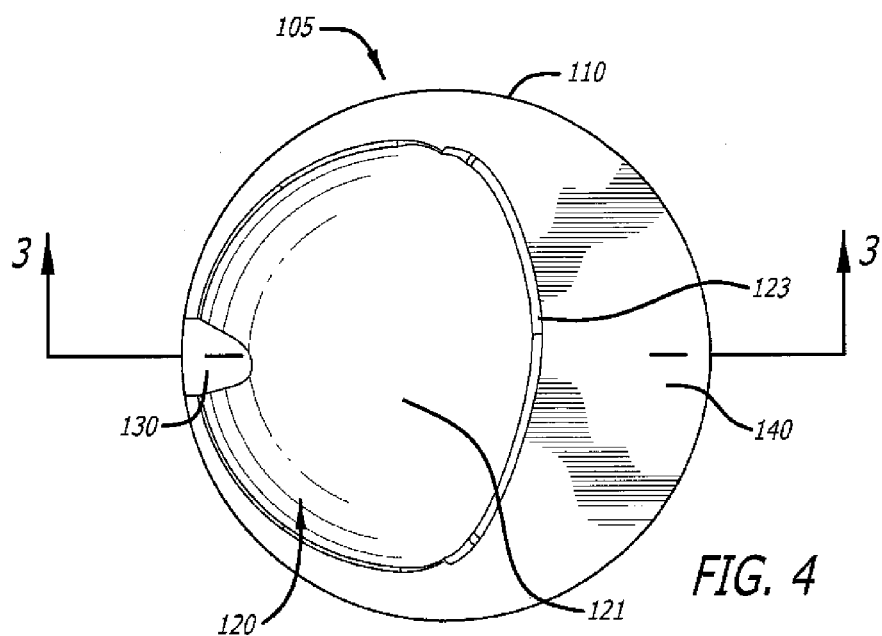
FIG. 4 is an end view of one of the pistons of FIG. 3 showing an end surface with a bowl formed therein.

In FIG. 3, the intake piston 105 and the exhaust piston 106 are at or near respective TDC positions in a cylinder with an axis 135. As per FIG. 4, the intake piston 105 has an end surface 110 in which an irregularly-shaped, non-circular bowl 120 is formed. In some aspects, the bowl 120 has the shape of a clam shell. The bowl 120 is offset towards a periphery portion of the end surface 110 in which a notch 130 constituting an injection port is formed. The bowl 120 is substantially surrounded by a large flat peripheral surface area 140 of varying width. The bowl has a concave surface 121 curving inwardly from a plane containing the surface area 140, toward the interior of the piston 105. The concave surface is asymmetrical. More particularly, as seen in FIG. 3, the concave surface 121 has a hook-like shape in cross section that transitions from a first level near the notch 130, to a second level, deeper into the piston than the first level, near the center of the piston, and then doubles back through an undercut portion 122 that curves back in the direction of the notch 130 to a lip 123. The end surface 111 of the exhaust piston 106 is essentially planar, with no bowl.

With further reference to FIG. 3, with the pistons 105 and 106 approaching their respective TDC locations, air in the cylinder is compressed in the shrinking space between the end surfaces 110 and 111 and is entrained in a radial squish flow toward the axis 135 of the cylinder. As radially-moving squish flow enters the bowl 120, it encounters the curved bowl surface 121. The curved bowl surface 121 redirects radially-moving squish flow into a direction that is skewed with respect to the radial direction. As the now-skewed squish flow crosses the cylinder axis 135, it encounters the sharp backward curve of the undercut portion 122 and curves back toward the lip 123 which imparts a tumbling motion 136 in which the air circulates transversely across the axis 135. Fuel is injected into the tumbling air by way of the notch 130. It is desirable that the squish gap (d), that is, the distance between the flat areas of the piston end surfaces at TDC, be very small; for example, we have designed the end surfaces for a squish gap 0.2 mm to 0.5 mm. A very small squish gap forces the compressed air into the bowl 120 at very high velocity and energy levels to create the desired tumble at the beginning of, and during, injection.

Second Combustion Chamber Construction:

FIGS. 5-9, 9A, and 10 illustrate a second combustion chamber construction in which the squish surface areas are increased with respect to those of the first construction so as to provide a relatively greater squish flow velocity and create a relatively stronger squish flow motion in order to facilitate more complete mixing of fuel and gas than the first construction. The cavity is defined between bowls with concave surfaces that are formed in the opposing piston end surfaces. In this regard, a bowl with a protruding side is formed in the end surface of each of the opposed pistons, and the pistons are rotationally oriented in the cylinder to place complementarily concave/convex surfaces of the bowls in opposition to one another. The complementary concave/convex surface portions define squish channels that are skewed in different directions with respect to a diametrical direction of the cylinder. Preferably, although not necessarily, the combustion chamber cavity defined between these two end surfaces is an elongated, irregularly-shaped cylinder that tapers toward each end. The closed, continuously-curved geometry of the combustion chamber and the oppositely-skewed squish flows create and sustain a tumble motion that circulates across the cylinder axis. We have calculated that this combustion chamber structure can provide up to a 3.5 times higher tumble ratio than the first construction.

In the second construction, an injection port is positioned along the periphery of the combustion chamber, and is oriented generally transversely to a combustion chamber major axis, allowing for a wide spray arrangement that can be produced by an injector nozzle with a large number of holes. Preferably, the injection port is oriented at least generally radially or perpendicularly to the major axis.

Figure 5:
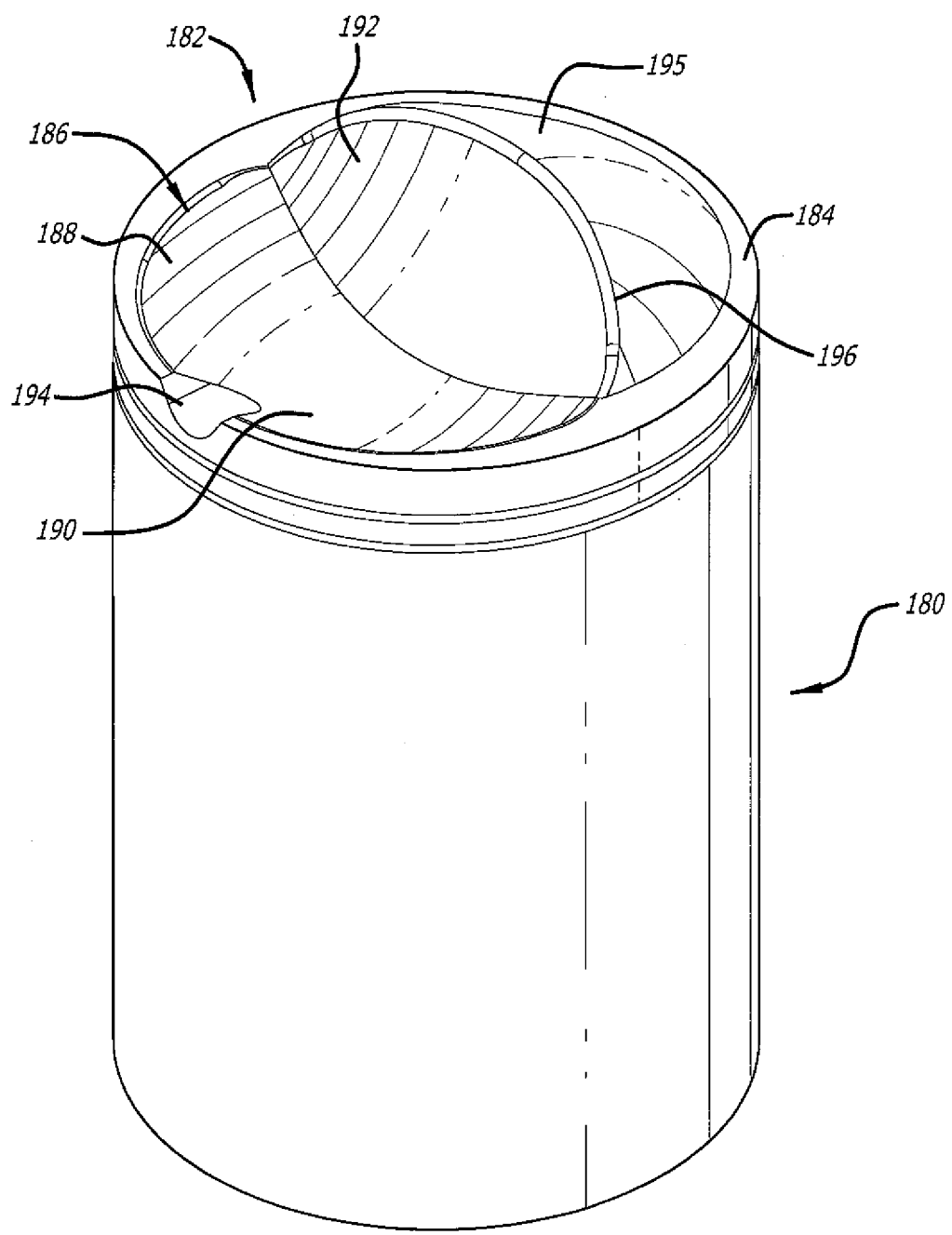
FIGS. 5 and 6 are elevational perspective views of respective pistons of a pair of pistons in which the end surfaces of the pair of pistons are formed to define a second combustion chamber construction.

In FIG. 5, the intake piston 180 has an end surface 182 with a flat circumferential area 184 centered on the longitudinal axis of the piston 180. The flat circumferential area 184 defines a periphery of the end surface 182. A bowl 186 is formed within the periphery. The bowl 186 has a concave surface 188 with a first portion 190 curving inwardly from a plane containing the flat peripheral area 184 and toward the interior of the piston 180, and a second portion 192 curving outwardly from the interior of the piston through the plane containing the flat peripheral area 184. A notch 194 extends radially through the periphery into the bowl 186. The end surface 182 further includes a convex surface 195 within the periphery that curves outwardly from the plane containing the flat circumferential area 184. The convex surface 195 meets the second portion 192 of the concave surface 188 to form a ridge 196 that protrudes outwardly from the end surface 182.

Figure 6:
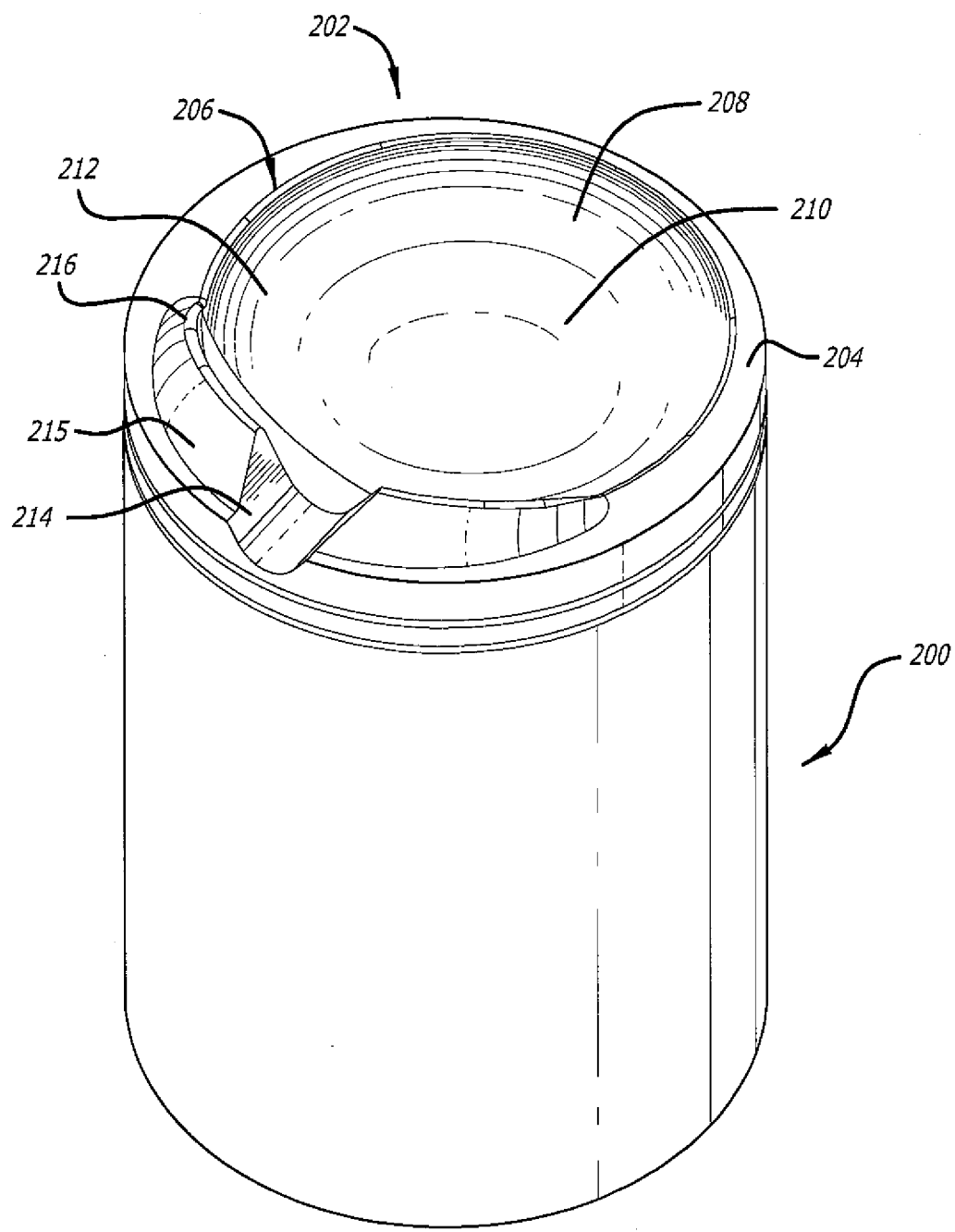

As per FIG. 6, the exhaust piston 200 has an end surface 202 with a flat circumferential area 204 centered on the longitudinal axis of the piston 200. The flat circumferential area 204 defines a periphery of the end surface 202. A bowl 206 is formed within the periphery. The bowl 206 is offset from the longitudinal axis of the piston 200. The bowl 206 has a concave surface 208 with a first portion 210 curving inwardly from a plane containing the flat circumferential area 204 toward the interior of the piston 200, and a second portion 212 curving outwardly from the interior of the piston through the plane containing the flat circumferential area 204. The end surface 202 further includes a convex surface 215 within the periphery that curves outwardly from the plane containing the flat circumferential area 204. The convex surface 215 meets the second portion 212 of the concave surface 208 to form a ridge 216 that protrudes outwardly from the end surface 202. A notch 214 extends through the periphery and the ridge 216 into the bowl 206.

The ridge 196 seen in FIG. 5 is substantially higher with respect to the end surface 182 of the intake piston than the ridge 216 seen in FIG. 6 is to the end surface 202 of the exhaust piston. The ridge 196 is also more centrally located with respect to the central axis of the piston 180 than the ridge 216 is to the axis of the piston 200. These asymmetries give the squish zone and the combustion chamber of the second construction somewhat asymmetrical shapes.

Figure 7:
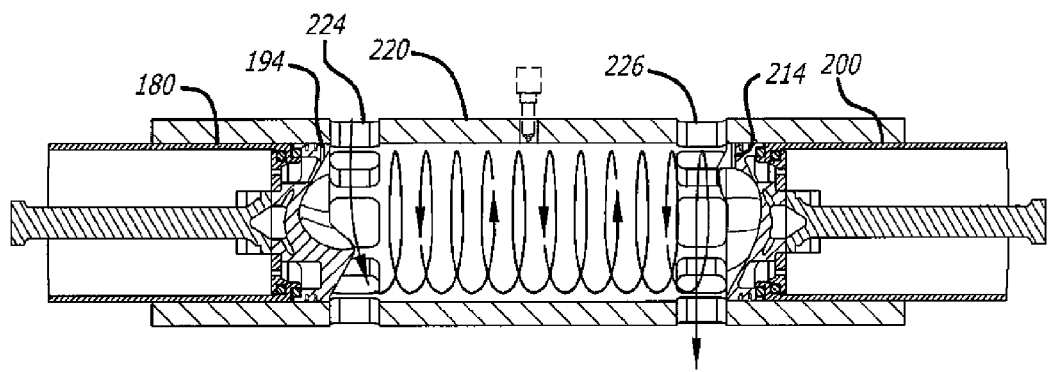
FIGS. 7-9 are side sectional drawings showing an operational sequence of an opposed-piston engine including a pair of pistons according to FIGS. 5 and 6.
Figure 8:
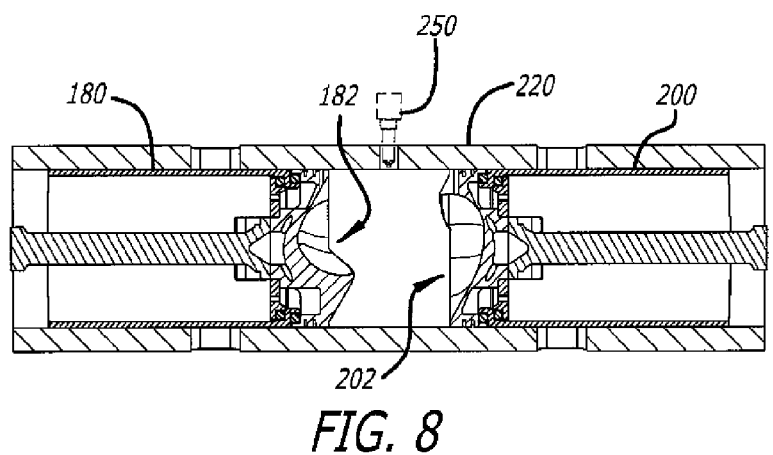
Figure 9:
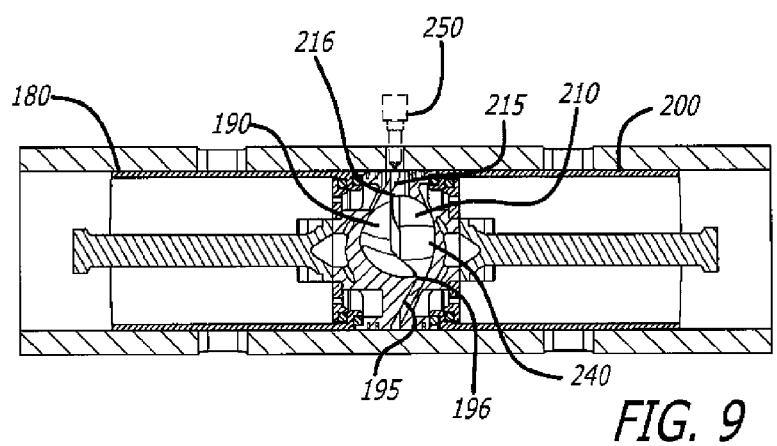
Figure 9A:
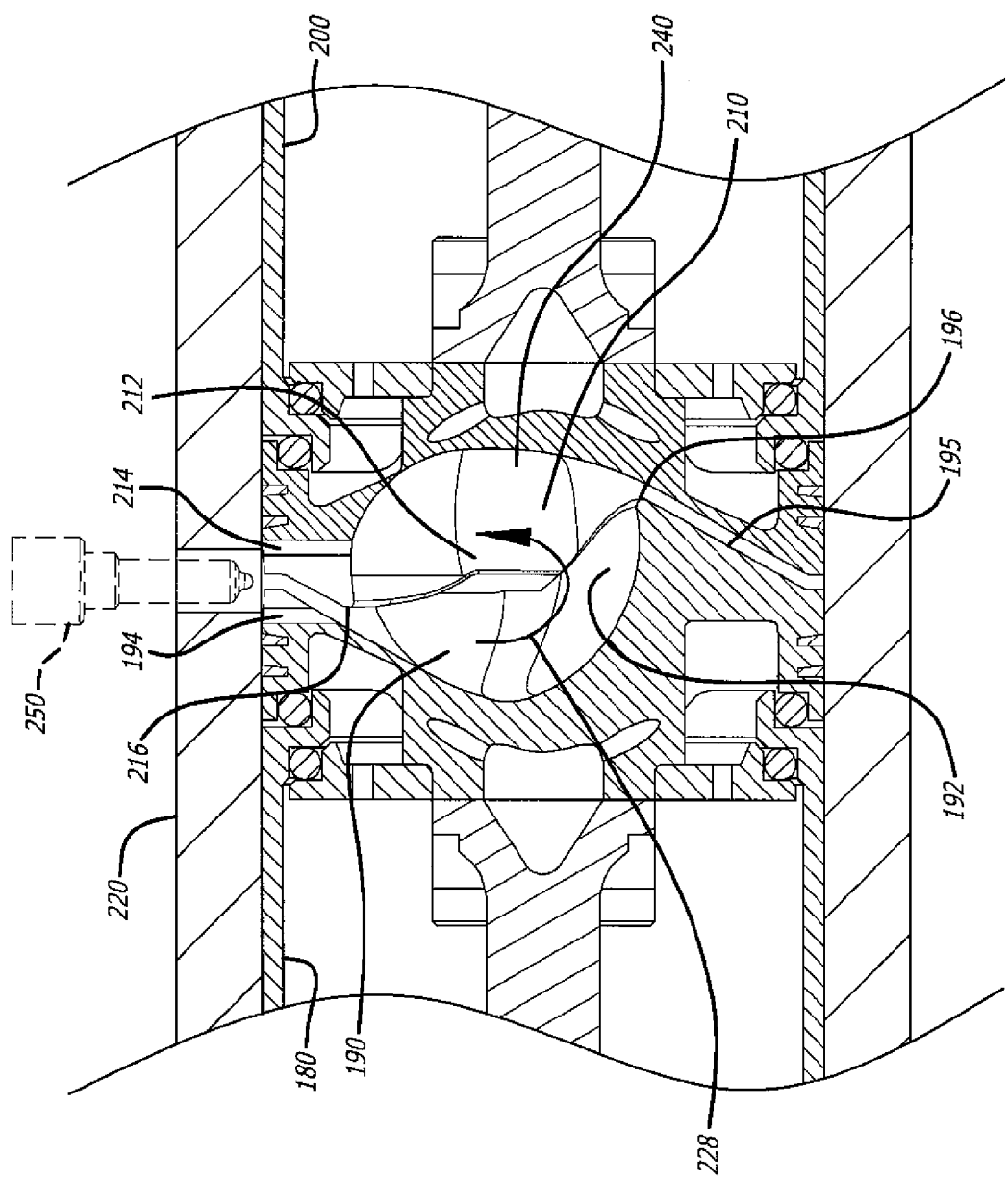
FIG. 9A is an enlarged view of a portion of FIG. 9 showing in greater detail the second combustion chamber construction.

Referring now to FIG. 7, the two pistons 180 and 200 are shown at or near respective BDC locations within a cylinder 220. The pistons are rotationally oriented in the bore of the cylinder 220 so as to align the notches 194, 214 with one another. Air is directed through the intake port 224 into the cylinder 220 as exhaust products flow out of the cylinder through the exhaust port 226. As the pistons move from BDC toward TDC as per FIG. 8, the ports are closed and the air in the cylinder is increasingly compressed between the end surfaces 182 and 202. With reference to FIGS. 8, 9, and 9A, as the pistons approach TDC, compressed air is squished between the convex surface 195 of the ridge 196 and the concave surface portion 210, and is also squished between the convex surface 215 of the ridge 216 and the concave surface portion 190. The squished air flows into combustion chamber space 240 defined between the end surfaces 182 and 202 where it is deflected by the concave surface portions 192 and 212 into a tumble motion 228. As is evident from FIGS. 9 and 9A, when the pistons 180 and 200 move through their respective TDC locations, the surfaces 196 and 216 mesh with the opposing concave surface portions 210 and 190 give the combustion chamber space 240 the shape of an irregular cylinder.

Figure 10:
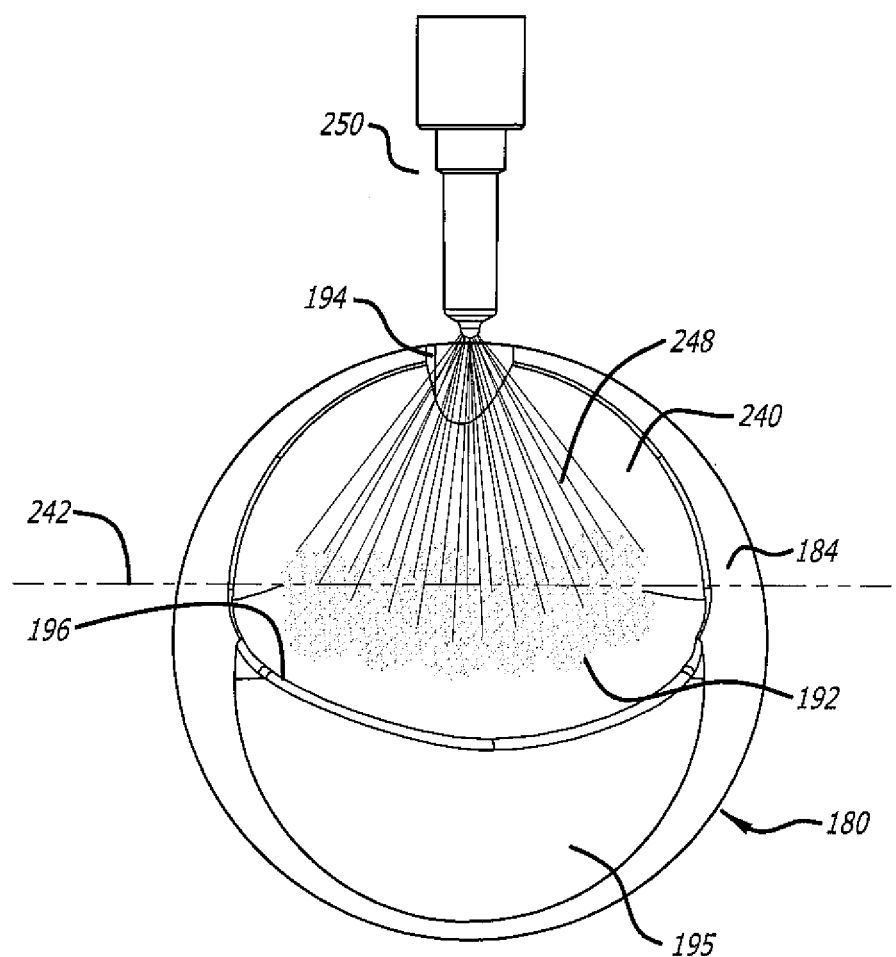
FIG. 10 is an end view of the piston of FIG. 5 showing a piston end surface with a bowl formed therein and a pattern of fuel injection.

As seen in FIGS. 9A and 10, the injection port defined by the notches 194 and 214 is positioned along the periphery of the combustion chamber space 240 and is oriented generally radially to the pistons or transversely to a combustion chamber "major axis" 242, allowing for a wide spray plume 248 produced by an injector nozzle 250. Preferably, the injection port is oriented radially with respect to the pistons 180 and 200 or perpendicularly to the major axis 242. The fuel 248 injected into the combustion chamber space 240 by the injector nozzle 250 is deflected by the concave surface portion 192 into mixture with the tumbling air, thus keeping the air/fuel mixture well within the combustion chamber space 240 and away from the cylinder wall.

Third Combustion Chamber Construction:

FIGS. 11-14, 15A, 15B, and 16 illustrate a third combustion chamber construction defined by complementary end surface structures of opposed pistons disposed in a ported cylinder of an opposed piston engine. The third combustion chamber construction is bordered by squish surface areas that are larger than the squish areas of both the first and second constructions so as to provide a relatively greater squish flow velocity and create a relatively stronger squish flow motion than do the first and second constructions. Identical generally symmetrical bowls are formed in the end surfaces of the opposed pistons, and the pistons are rotationally oriented to place complementary curved surfaces of the bowls in opposition in order to maximize the squish surface areas of the squish zone.

The end surface structure of each piston has a periphery surrounding a bowl defining a concave surface. The concave surface includes a first portion curving away from a plane containing the periphery surface toward the interior of the piston and a second portion curving away from the first portion and protruding outwardly in part from the plane. A convex surface opposite the bowl curves away from the periphery and protrudes outwardly from the plane. The convex surface meets the second portion of the concave surface to form a ridge therewith. Preferably, but not necessarily, the bowl has a semi-ellipsoidal shape. The end surface structure is provided on both pistons and the pistons are disposed in the bore of a ported cylinder with their end surfaces oriented to place complementary curved surfaces of the end surface structures in opposition in order to define a combustion chamber. Preferably, but not necessarily, the combustion chamber space defined between these two end surfaces is, or is very close to, an elongated ellipsoidal cylinder, providing a generally symmetrical geometry to reinforce and sustain the tumble motion. It is estimated that this combustion chamber structure provides a tumble ratio double that of the second construction. In the third construction, it is desirable that at least one injection port be positioned on the major axis of the combustion chamber.

Figure 11:
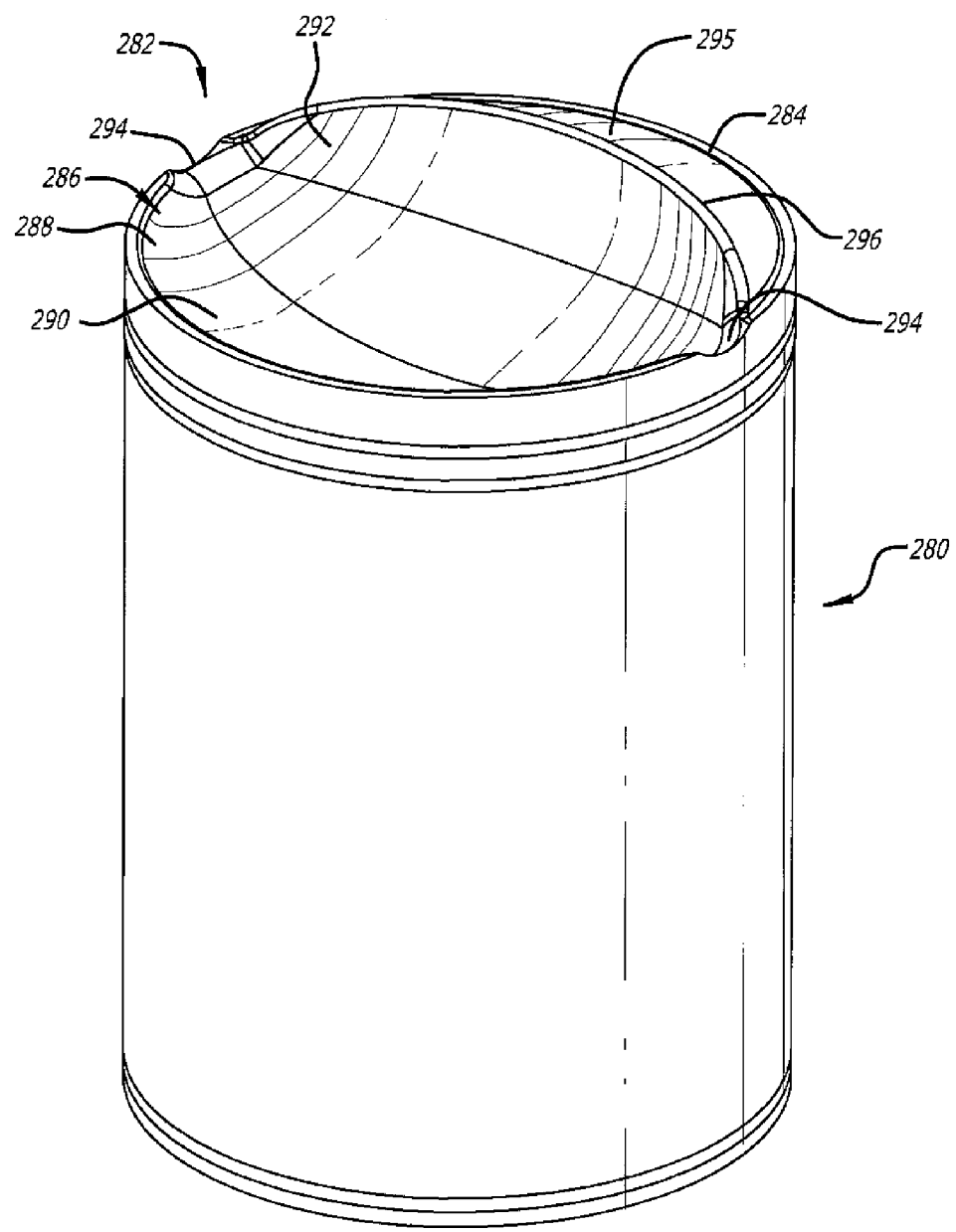
FIG. 11 is an elevational perspective view of a piston of a pair of pistons in which identical end surfaces of the pair of pistons are formed to define a third combustion chamber construction.
Figure 16:
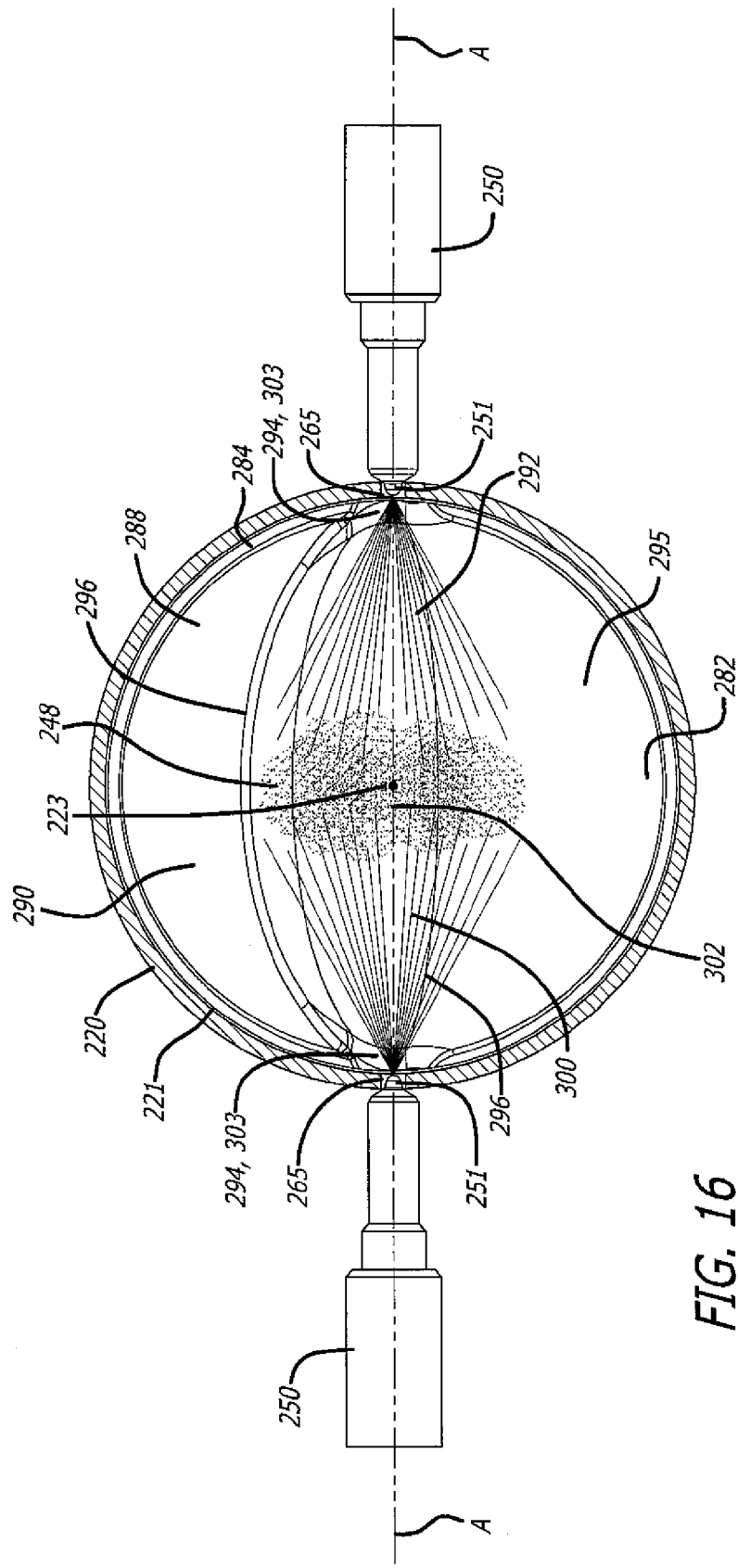
FIG. 16 is an end view of one of the pistons of FIG. 11 showing an end surface with a bowl formed therein and a pattern of fuel injection.

The structures of the piston end surfaces that define the third construction are essentially identical to each other; accordingly, the piston 280 shown in FIGS. 11 and 16 represents both the intake piston and exhaust piston. The piston 280 has an end surface 282. A flat circumferential area 284 centered on the longitudinal axis of the piston 280 defines a periphery of the end surface 282. A bowl 286 is formed within the periphery. The bowl 286 has a concave surface 288 with a first portion 290 curving inwardly from a plane containing the flat circumferential area 284, toward the interior of the piston 280, and a second portion 292 curving outwardly from the interior of the piston through the plane. The end surface 282 further includes a convex surface 295 within the periphery that curves outwardly from the plane. The convex surface 295 meets the second portion 292 of the concave surface 288 to form a ridge 296 that protrudes outwardly from the end surface 282. At least one notch 294 extends through the periphery into the bowl 286; preferably two aligned notches 294 are provided.

Figure 12:
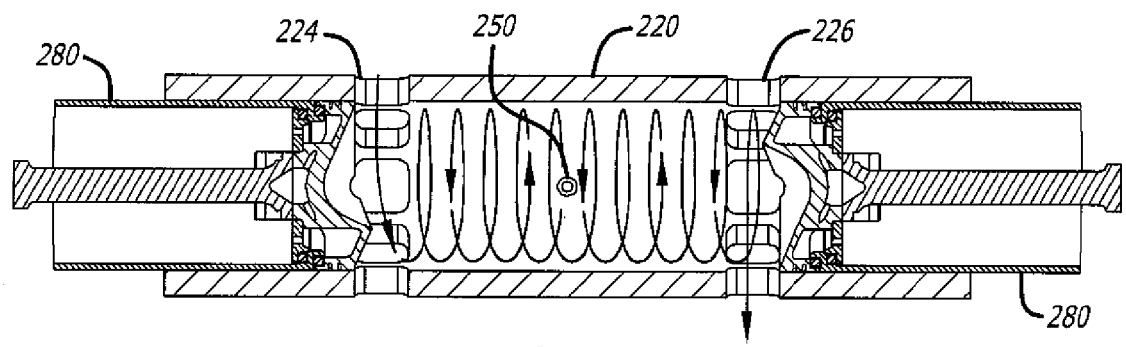
FIGS. 12-14 are side sectional drawings showing an operational sequence of an opposed-piston engine including a pair of pistons according to FIG. 11.
Figure 13:
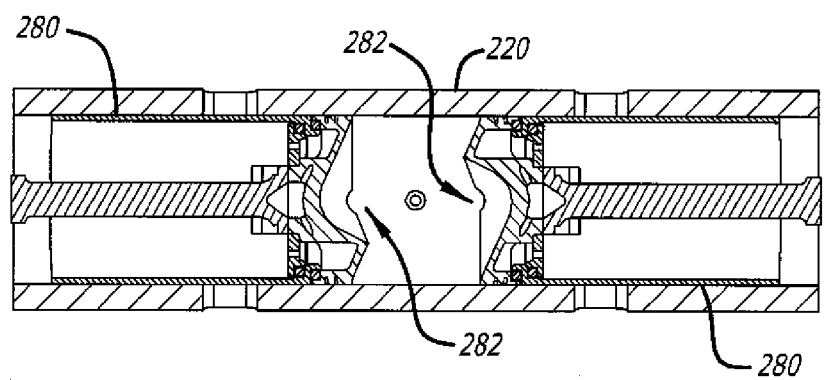
Figure 14:
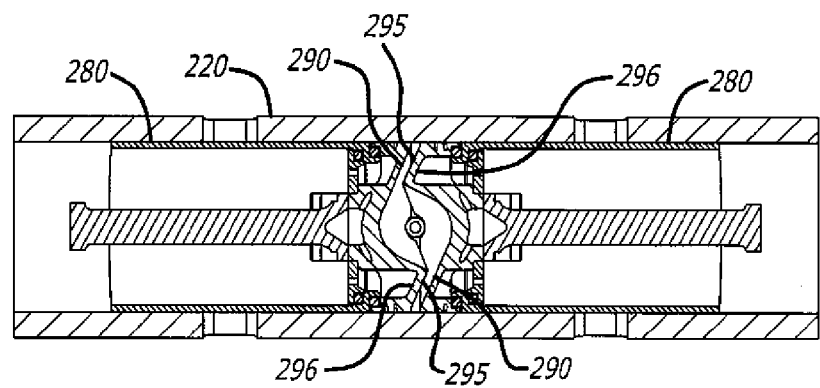
Figure 15A:
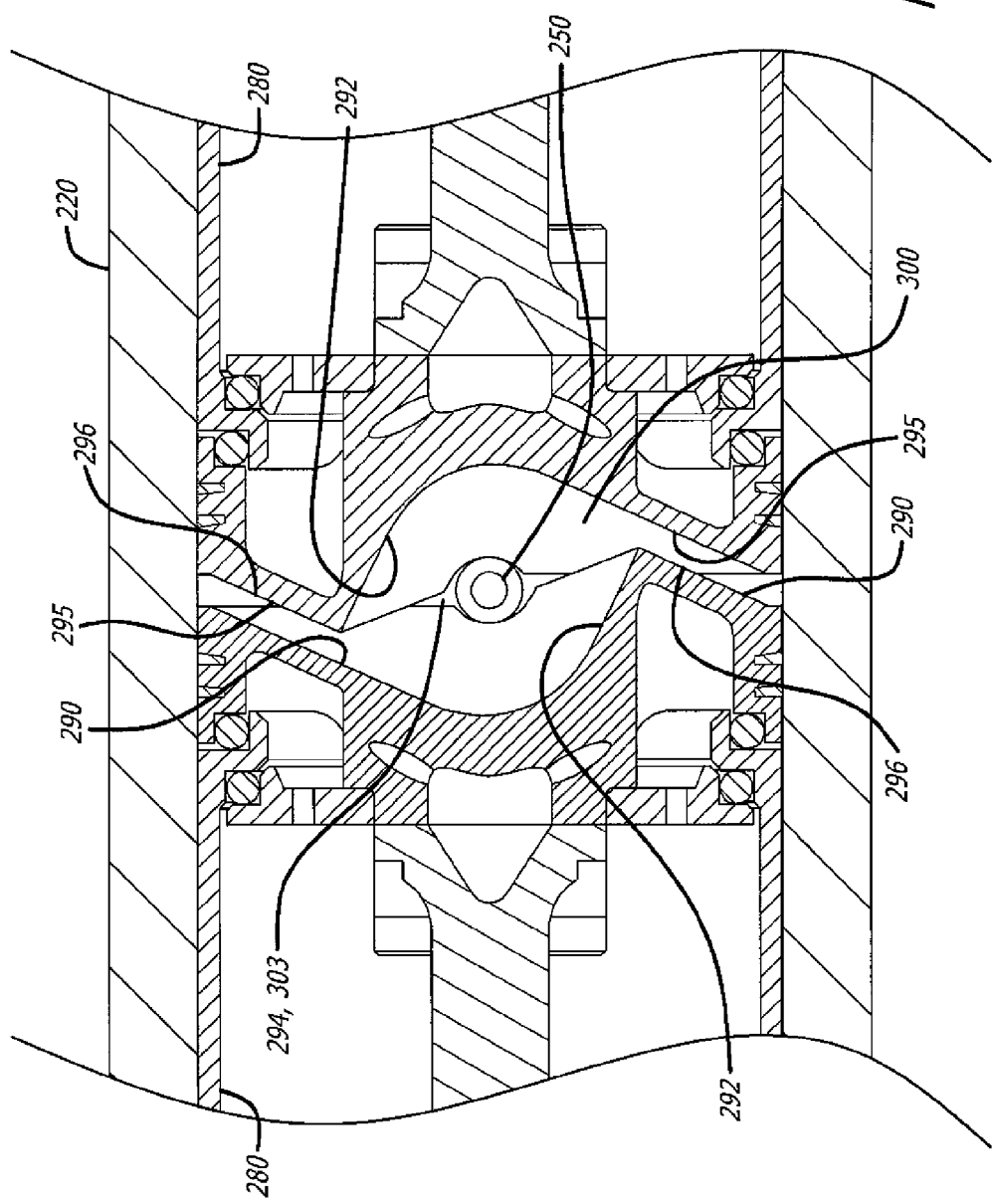
FIG. 15A is an enlarged view of a portion of FIG. 14 showing in greater detail the third combustion chamber construction.
Figure 15B:
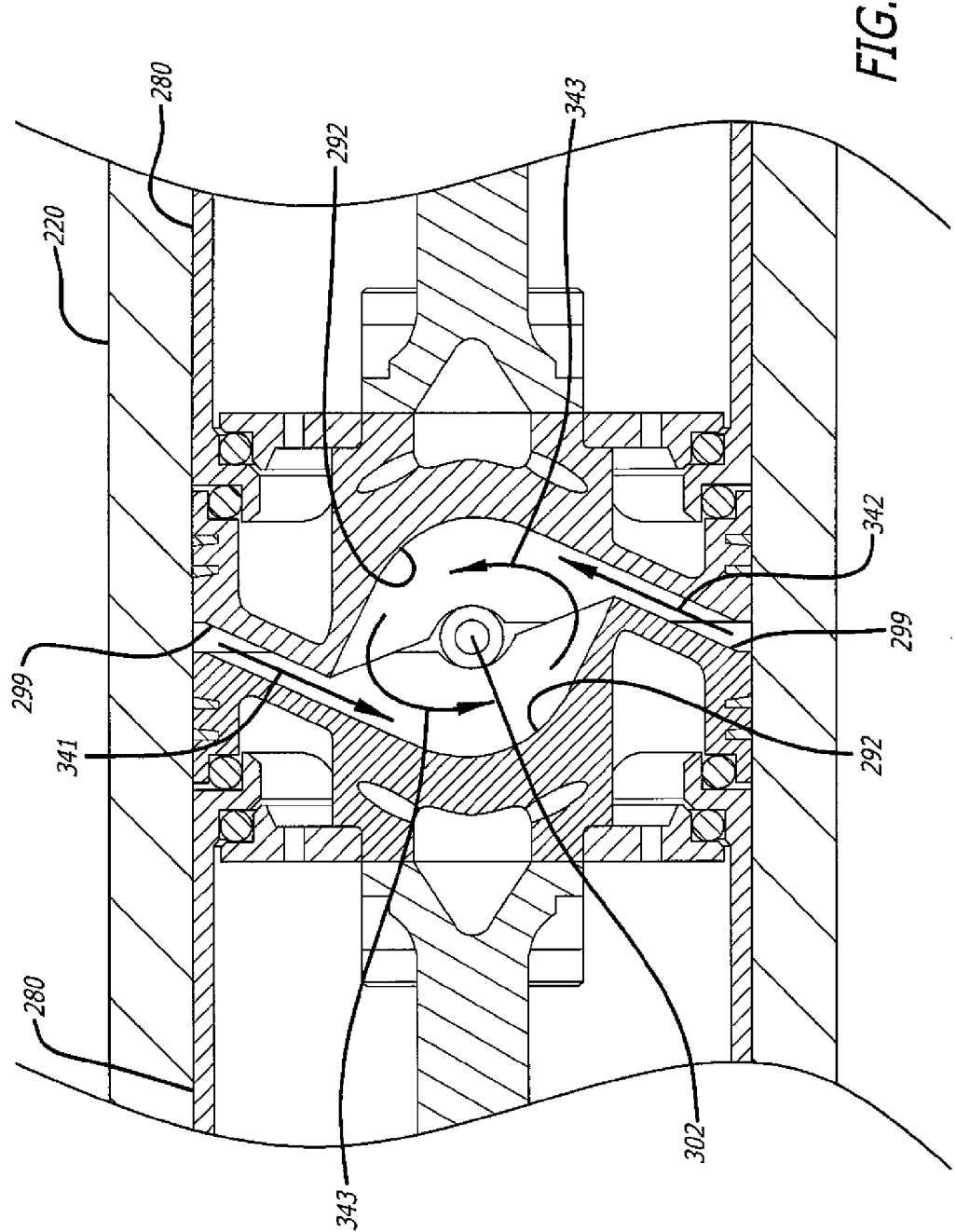
FIG. 15B is the enlarged view of FIG. 15A showing squish and tumble air flows in the third combustion chamber construction

Referring now to FIG. 12-14, the two pistons 280 having end surfaces shaped as per FIG. 11 are shown at or near respective BDC locations within the ported cylinder 220. The pistons are rotationally oriented in the bore of the cylinder 220 so as to align the end surfaces in complement; that is to say, the concave surface portion 290 of one piston 280 faces the convex surface 295 of the other piston. Charge air is forced through the intake port 224 into the cylinder, as exhaust products flow out of the cylinder through the exhaust port 226. For purposes of scavenging and air/fuel mixing, the charge air is caused to swirl as it passes through the intake port 224. As the pistons 280 move from BDC toward TDC as per FIG. 13, the intake and exhaust ports 224 and 226 close and the swirling charge air is increasingly compressed between the end surfaces 282. With reference to FIGS. 15A and 15B, as the pistons 280 approach TDC, compressed air flows from the peripheries of the end surfaces through squish channels 299 defined between the concave-convex surface pairs 290, 295. These squish airflows flow into a combustion chamber 300 having a cavity defined between the end surface bowls. At the same time, compressed charge air nearer the longitudinal axis of the cylinder continues to swirl. As the pistons 280 move through their respective TDC locations, the opposing concave-convex surfaces 290, 295 mesh with one another to give the combustion chamber cavity an elongated, generally ellipsoidal shape. Opposing pairs of notches 294 (see FIG. 11) in the end surfaces 282 define injection ports 303 (see FIG. 15A) that open into the combustion chamber 300 at opposing pole positions of the ellipsoidal shape. As per FIG. 16, the elongated, ellipsoidal shape has a major axis 302 that extends between the opposing pole positions. In other words, the injection ports 303 are aligned along the major axis 302.

Figures 17A, 17B:
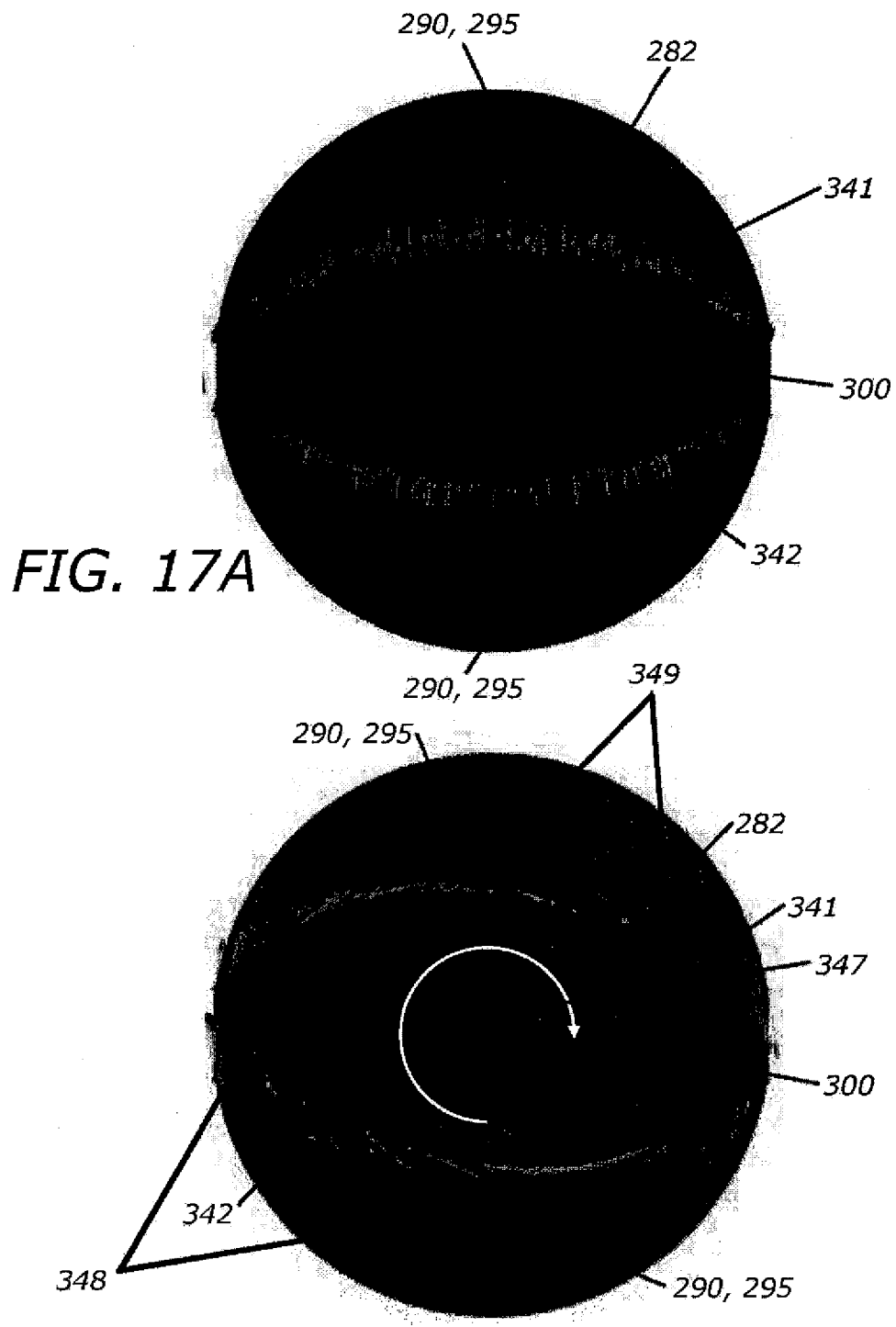
FIGS. 17A and 17B are schematic illustrations of the piston end surface view of FIG. 16 showing interaction between the end surface and squish flow, without swirl (FIG. 17A), and with swirl (FIG. 17B).

Interactions between the end surfaces 282 and charge air are illustrated in FIGS. 17A and 17B. FIG. 17A shows squish flows into the combustion chamber 300 without charge air swirl; FIG. 17B illustrates how the squish flows affect and are affected by swirl. As the pistons move toward TDC, squish regions (between opposing concave-convex surface pairs 290, 295) produce locally high pressure that directs squish flows of charge air into the central region of the combustion chamber 300. In this regard, with reference to FIGS. 15A, 15B and 17A, at the start of injection, when the pistons are near their respective TDC locations, the concave-convex surface pairs 290, 295 generate squish flows 341, 342 into the combustion chamber 300. As illustrated in FIG. 15B, these squish flows are oppositely-directed, parallel, and skewed with respect to the major axis 302. This spatial relationship causes generation of a tumbling motion 343 when the squish flows encounter the outwardly-directed end surface portions 292. In this regard, a tumbling motion is a circulating motion of charge air in the combustion chamber that is at least generally transverse to the longitudinal axis of the cylinder; in the case of the tumbling motion 343, the circulation is generally around the major axis 302. As per FIG. 17B, when swirl 347 is added to charge air motion, the swirling motion, depending on its intensity, counteracts or overcomes squish flow in the combustion chamber regions 348, and enhances the squish flow at the interface between the combustion chamber regions 349. These swirl-plus-squish interactions generate a more intense tumbling motion around the major axis 302 than do the squish flows alone. Modeling indicates that as the intensity of the initial swirl is increased, the intensity of this tumbling motion produced near TDC also increases. In addition, the swirl-plus-squish interactions with the end surfaces of the pistons in the combustion chamber 300 produce a second tumbling motion about an axis that is orthogonal to the major axis. For example, such an axis corresponds to, or is generally parallel to, the equatorial diameter of the elongated ellipsoidal shape. Thus, at the start of injection, the turbulent motion of the charge air in the combustion chamber 300 includes a swirl component, incoming squish flows, and tumble components about orthogonal tumble axes.

With reference to FIGS. 15A, 15B, and 16, fuel 248 is injected into the tumbling air in the combustion chamber space 300 by opposed injectors 250. According to the third construction, the combustion chamber is essentially centered with respect to the longitudinal axes of the cylinder and the pistons. When the pistons are near TDC, at least one pair of aligned notches 294 defines at least one injection port 303 opening into the combustion chamber cavity 300. The at least one injection port 303 is located at or near one end of the combustion chamber, aligned with the major axis 302 thereof, so that the fuel plume 248 is confined between and guided by the opposing concave surface portions 292. Preferably, two injection ports are provided at each end of the combustion chamber cavity 300, aligned with the major axis thereof, and fuel is injected from two opposing injectors 250 through the injection ports.

In some aspects, it is desirable to inject at least one spray of fuel into a combustion chamber having an elongated ellipsoidal shape. It is preferable, however, to inject a pair of opposing sprays of fuel into the turbulent charge air motion generated in the combustion chamber by swirl-plus-squish interactions, where the opposing sprays meet in the combustion chamber and form a cloud of fuel that is well mixed with the compressed charge air due to the turbulence. With reference to FIG. 16, the view is a sectional one at or near the longitudinal midpoint of the cylinder 220, looking directly into the cylinder's bore 221 toward a piston end surface 282 disposed in the bore at a position where it and the unseen piston end surface define the combustion chamber 300. The cylinder's axis is indicated by reference numeral 223. According to the third construction, the combustion chamber 300 is essentially centered longitudinally with respect to the cylinder's axis 223. Fuel injectors 250 are positioned with their nozzle tips 251 disposed at injector ports 265. Each injector nozzle tip has one or more holes through which fuel 248 is injected through a respective injector pod, into the combustion chamber 300. Preferably, each injector tip 251 sprays fuel 248 in a diverging pattern that is aligned with and travels through an injection port 303 along the major axis 302 of the ellipsoidal combustion chamber 300, into the central portion of the combustion chamber 300. Preferably, opposing spray patterns of fuel are injected into the turbulent air motion in the combustion chamber 300. In some aspects, the opposing spray patterns meet at or near the center of the combustion chamber and form a cloud of fuel droplets that are mixed with charge air having a complex turbulent motion that includes swirl, squish, and tumble components. Preferably, but not necessarily, the fuel injectors 250 are disposed such that their axes A are in alignment with each other and a diametrical direction of the bore 221. This causes the injector tips to be oriented in opposition along a diameter of the cylinder 220 that is aligned with the major axis 302.

The combustion chamber constructions illustrated and described hereinabove are intended to be utilized in opposed-piston combustion-ignition engines which impose swirl on the charge of air forced into the cylinder. Nevertheless, the combustion chamber construction can be utilized in those opposed-piston combustion-ignition engines that do not swirl the charge air.

The pistons and associated cylinder are manufactured by casting and/or machining metal materials. For example, the pistons may be constituted of a skirt assembled to a crown on which a piston end surface is formed. As a further example, but without excluding other materials, the crown may comprise a high carbon steel such as 41-40 or 43-40, and the skirt may be formed using 4032-T651 aluminum. In such cases, the cylinder preferably comprises a cast iron composition.

Although the invention has been described with reference to preferred constructions, it should be understood that various modifications can be made without departing from the spirit of the invention. Accordingly, the invention is limited only by the following claims.

The invention claimed is:

1. A combustion chamber structure for an internal combustion engine including at least one cylinder with longitudinally-separated exhaust and intake ports and a pair of pistons disposed in opposition to one another in a bore of the cylinder, the combustion chamber structure including a squish zone defined between complementary squish surfaces on opposing end surfaces of the pistons, an elongated cavity defined between the opposing end surfaces, and a pair of diametrically opposed injection ports that extend through peripheral areas of the end surfaces into the cavity, in which:

the end surface of each piston defines the combustion chamber with the end surface of the opposing piston, and the end surface has a circumferential area centered on a longitudinal axis of the piston to define a periphery of the end surface, and a bowl within the periphery, the bowl defining a concave surface with a first portion curving inwardly from a plane containing the circumferential area toward the interior of the piston and a second portion curving outwardly from the interior of the piston through the plane; further in which, as the pair of pistons approach top dead center in the cylinder, compressed air flows from the periphery of the end surface of each piston, through two or more squish channels defined by the squish surfaces, the squish channels skewed in different directions with respect to a diametrical direction of the cylinder, into the combustion chamber; the concave surface of each end surface deflects the compressed air into a tumble motion; and the compressed air swirls about a major axis of the combustion chamber, in which the pair of injection ports are positioned on the major axis of the combustion chamber.

2. The combustion chamber structure of claim 1, in which the end surface further includes a convex surface within the periphery and curving outwardly from the plane containing the circumferential area, and the convex surface meets the second portion of the concave surface to form a ridge.

3. The combustion chamber structure of claim 2, in which the bowl has a semi-ellipsoidal shape.

4. The combustion chamber structure of claim 3, in which the elongated cavity is an ellipsoidal cylinder.

5. The combustion chamber structure of claim 2, in which the diametrically opposed injection ports include notches in the periphery at opposing positions on the major axis of the combustion chamber.

6. The combustion chamber structure of claim 2, in which the diametrically opposed injection ports include notches in the periphery at opposing positions on the major axis of the elongated cavity.

7. The combustion chamber structure of claim 1, in which the squish zone consists essentially of two or more squish channels defined essentially by the squish surfaces on the opposing piston end surfaces.

* * * * *